Patented Feb. 11, 1941

2,231,403

UNITED STATES PATENT OFFICE 2,231,403

REACTION OF NITROPARAFFINS WITH ALDEHYDES

Joseph A. Wyler, Allentown, Pa., assignor to Trojan Powder Company, Allentown, Pa.

No Drawing. Application June 9, 1939, Serial No. 278,265

9 Claims. (Cl. 260—635)

This invention relates to the condensation of nitroparaffins with aldehydes. More particularly, it relates to the condensation in the presence of an alkali and an oxalate and is specifically concerned with the reaction of mononitromethane with formaldehyde, to form trimethylolnitromethane.

It is known that nitromethane reacts with formaldehyde or paraformaldehyde in the presence of an alkali, to form trimethylolnitromethane, the general equation for this reaction being

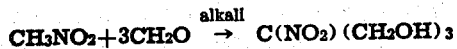

$$CH_3NO_2 + 3CH_2O \xrightarrow{\text{alkali}} C(NO_2)(CH_2OH)_3$$

This equation represents a simple reaction. However, several simultaneous side reactions actually take place, the extent and nature of them depending in part upon the proportions of reactants used, the temperature and time of reaction, the alkalinity of the reaction mixture, and the solvent medium present. Some of these side reactions lead to the formation of objectionable brown colored products which are of variable solubility in water and interfere with the subsequent purification of the trimethylolnitromethane.

It is an object of the invention to prevent the formation of these objectionable products. A further object is to make possible reacting formaldehyde and nitromethane, at relatively high temperatures with minimized production of deleterious products and with satisfactory yields of trimethylolnitromethane, in shorter periods of time than heretofore used. Other objects will be apparent from the description that follows.

I have discovered that, if the reaction between formaldehyde and nitromethane is carried out in a solution containing oxalate ions, that is, an oxalate, the reaction proceeds without the formation of any substantial amount of brownish colored material and, furthermore, that the reaction mixture may be evaporated at elevated temperatures without the formation of the said material. Proceeding in this manner, I am able to crystallize practically colorless trimethylolnitromethane from the reaction mixture.

As the agent for preventing the formation of this brownish material and giving the desired reaction product, I use an oxalate that is appreciably soluble in the reacting mixture including the diluent or medium to be described later. For example, the agent may be the oxalate of one or more of the following elements or compounds: sodium, potassium, calcium, strontium, cobalt, nickel, manganese, zinc, iron, ammonium, urea, aniline, and para-aminophenol. I have found both organic and inorganic oxalates to be satisfactory for the purpose.

In order more particularly to point out my invention, the following examples are given by way of illustration, all proportions being expressed as parts by weight.

Example I

Twenty parts of nitromethane are added to 100 parts of a 30 per cent solution of formaldehyde in water. There is added about 1.0 part of sodium oxalate and about 0.5 part of sodium bicarbonate. The reactants are mixed at ordinary temperature, the mixture being stirred continuously. The temperature of the mixture is allowed to rise to about 50° C. and is held there for approximately one hour, by any suitable means. The temperature is then raised to about 95° C. and maintained there for another hour or somewhat more.

The reaction mixture, either after being cooled to room temperature or without precooling, is treated with an acid, say, with hydrochloric or sulfuric acid, in amount adequate to produce a slight acidity in the mixture. The mixture is then concentrated by evaporation and subsequently cooled, to effect crystallization of trimethylolnitromethane from the concentrated mixture upon cooling.

The mother liquor from the crystals obtained, may be used over again with a fresh mixture of formaldehyde, nitromethane, an oxalate and sodium bicarbonate, in essentially the same proportions as above, and the process repeated as often as desirable.

Example II

Twenty parts of nitromethane are added to 30 parts of paraformaldehyde, 100 parts of commercial ethyl alcohol (92 per cent by weight), and a sufficient amount of sodium bicarbonate to make the mixture alkaline to litmus. The process from this stage on is essentially as described in the example given above.

In these examples it is to be noted that I have used, as the liquid diluents or media, water in the 30 per cent formaldehyde solution of Example I, and ethyl alcohol in Example II. I may use for the purpose other liquids that are practically inert to nitromethane and formaldehyde but dissolve the reacting material as well as an appreciable amount of the selected oxalate. Thus, I may use any saturated aliphatic alcohols containing not more than six carbon atoms to the molecule, or esters such as the acetates, formates, or propionates of the said alcohols.

The formaldehyde may be introduced in gaseous form into the medium. Also, I may use, in place of formaldehyde or paraformaldehyde one of the polyoxymethylenes.

I may vary, over a wide range, the proportion of the selected oxalate to the other reactants. There may be used, for example as low a proportion as the saturation quantity of the relatively insoluble calcium oxalate in the reaction mixture and as high a proportion as desired, up to the saturation amount of a soluble oxalate such as sodium oxalate or the like. Ordinarily, I do not use more of a soluble oxalate than can be dissolved in the mixture. On the other hand, I prefer to use 0.1 part to 1 part of the oxalate to 20 parts of nitromethane or equivalent.

I may vary the temperature of the reaction from ordinary atmospheric to 95° C. or even somewhat higher, so long as the temperature is maintained below that of substantial decomposition of the desired product. The total time of the reaction may range, suitably, from about 2 hours to 24 hours or more.

Another alkali may be used in place of the sodium bicarbonate. Among such alkalies are the hydroxides of sodium, calcium, strontium and barium, carbonates of sodium, potassium, or magnesium, sodium phosphate, trimethyl or triethyl amine, and tetramethyl or tetraethyl ammonium hydroxide. An amount of the alkali sufficient to produce alkalinity to litmus is used.

I may vary the proportion of aldehyde to nitroparaffin. Preferably, I use a slight excess of the aldehyde. Thus, I may use about 3 to 4 molecules of the aldehyde to one molecule of nitroparaffin.

Also, I may vary over a wide range the concentration of aldehyde in the reaction mixture. In general, I prefer to use, in the reaction mixture, formaldehyde in a 30 to 40 per cent solution in water, nitromethane in slightly less than the theoretical proportion, and sodium oxalate to the extent of about one percent of the weight of the nitromethane.

Other nitroparaffins may be substituted for the nitromethane, the conditions under which reaction is effected being as described in the example using nitromethane. However, the other nitroparaffins give not trialkylol compounds but mono- or di-derivatives for which the following formulas are representative:

The character "$x$" in the above formulas represents an integral number or zero, the integral number suitably being small.

There are times, especially when water is used as the diluent or solvent medium of the reaction mixture, that relatively insoluble oxalates are used instead of sodium oxalate. For example, I may use calcium oxalate, even though it is relatively insoluble in the mixture, and obtain excellent results. The mixture resulting from reaction of such a composition remains essentially colorless and, by simple filtration or settling, may be freed from all but a trace of the oxalate, thus providing a substantially pure solution of trimethylolnitromethane for the crystallization step.

It is necessary to have the oxalate present in the reaction mixture at an early stage in the reaction in order to obtain the best results. If the oxalate is added after a yellow color has once formed, this color will persist. Consequently, I prefer to add the oxalate at the very beginning of the reaction between the aldehyde and nitroparaffin and to have it present throughout the reaction and subsequent concentration by evaporation.

The nitroparaffins herein referred to are the mono-derivatives.

In the examples given above, certain operative details have been mentioned. It is to be understood, however, that I do not limit myself to these details except as indicated in the attached claims.

I claim:

1. The process of effecting condensation which comprises reacting formaldehyde with a nitroparaffin in the presence of a liquid ionizing diluent, an alkali, and an ionizable oxalate soluble in the reaction medium.

2. The process of effecting condensation which comprises reacting formaldehyde with mononitromethane at a temperature not in excess of 95° C. and in the presence of a liquid ionizing diluent, an alkali, and an ionizable oxalate that is appreciably soluble in the said diluent.

3. The process of effecting condensation which comprises reacting formaldehyde with mononitromethane at a temperature wtihin the range of approximately 50° to 95° C. and in the presence of a liquid ionizing diluent, an alkali, and an ionizable oxalate that is appreciably soluble in the said diluent.

4. The process of effecting condensation which comprises reacting formaldehyde with mononitromethane in the presence of water, an alkali, and an appreciably water-soluble ionizable oxalate.

5. The process of effecting condensation which comprises reacting formaldehyde with mononitromethane in the presence of a saturated aliphatic alcohol containing not more than six carbon atoms to the molecule, an alkali and an ionizable oxalate soluble in the reaction medium.

6. The process for the preparation of trimethylolnitromethane which comprises condensing mononitromethane with formaldehyde in an alkaline, ionizing liquid medium containing an ionizable oxalate soluble in the reaction medium.

7. The process for the preparation of trimethylolnitromethane which comprises condensing mononitromethane with formaldehyde in an alkaline ionizing liquid medium containing an inorganic oxalate that is appreciably soluble in the said medium.

8. The process for the preparation of trimethylolnitromethane which comprises condensing mononitromethane with formaldehyde in an alkaline ionizing liquid medium containing urea oxalate in solution.

9. The process of effecting condensation which comprises reacting formaldehyde with a mono-nitroparaffin at a temperature not in excess of 95° C. and in the presence of a liquid ionizing diluent, an alkali, and an ionizable oxalate that is appreciably soluble in the said diluent.

JOSEPH A. WYLER.